US007924352B2

(12) United States Patent
Hsiao et al.

(10) Patent No.: US 7,924,352 B2
(45) Date of Patent: Apr. 12, 2011

(54) LIQUID CRYSTAL DISPLAY PANEL AND PIXEL STRUCTURE THEREOF

(75) Inventors: Chia-Chiang Hsiao, Hsin-Chu (TW); Cheng Lo, Hsin-Chu (TW); Ching-Sheng Cheng, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 379 days.

(21) Appl. No.: 12/269,836

(22) Filed: Nov. 12, 2008

(65) Prior Publication Data
US 2010/0002159 A1 Jan. 7, 2010

(30) Foreign Application Priority Data

Jul. 4, 2008 (TW) ................................ 97125226 A (51) Int. Cl.
*G02F 1/1333* (2006.01)
*G02F 1/1343* (2006.01)
*G02F 1/1337* (2006.01)
(52) U.S. Cl. ............ 349/37; 349/38; 349/123; 349/129; 349/139
(58) Field of Classification Search .................. 349/123, 349/124, 132, 129, 139.143, 144, 147, 158.41, 349/42, 37, 38, 39
See application file for complete search history.

(56) References Cited

U.S. PATENT DOCUMENTS

| 6,927,807 B2 | 8/2005 | Kim | 349/38 |
| 7,511,791 B2 * | 3/2009 | Hong | 349/139 |
| 2002/0109652 A1 | 8/2002 | Lim | 349/87 |
| 2004/0252249 A1 | 12/2004 | Hong | 349/37 |
| 2005/0105010 A1 | 5/2005 | Oh | 349/50 |
| 2007/0236414 A1 | 10/2007 | Lin | 345/60 |
| 2008/0002123 A1 * | 1/2008 | Kim | 349/139 |
| 2009/0167972 A1 * | 7/2009 | Hong | 349/37 |
| 2010/0002159 A1 * | 1/2010 | Hsiao et al. | 349/37 |

FOREIGN PATENT DOCUMENTS
TW 580605 3/2004
* cited by examiner

*Primary Examiner* — Brian M Healy
(74) *Attorney, Agent, or Firm* — Winston Hsu; Scott Margo (57) ABSTRACT

A pixel structure of a liquid crystal display panel includes a first transparent substrate, a first data line, a second data line, a transparent electrode, and a compensating conducting pattern layer. In a display region, the first side of the transparent electrode and the first data line partially overlap, forming a first parasitic capacitor, the second side of the transparent electrode and the second data line partially overlap, forming a second parasitic capacitor smaller than the first parasitic capacitor. In a non-display region, the first side of the transparent electrode and the first data line partially overlap, forming a third parasitic capacitor, and the second side of the transparent electrode and the compensating conducing pattern layer partially overlap, forming a fourth parasitic capacitor. The total parasitic capacitance of the first and the third parasitic capacitors and the total parasitic capacitance of the second and the fourth parasitic capacitors are substantially equal.

16 Claims, 7 Drawing Sheets

LIQUID CRYSTAL DISPLAY PANEL AND PIXEL STRUCTURE THEREOF

BACKGROUND OF THE INVENTION

1. Field of the Invention

The present invention relates to a liquid crystal display panel and pixel structure thereof, and more particularly, to a pixel structure of a liquid crystal display panel, wherein the parasitic capacitance generated from one side of a transparent electrode and a data line is unequal to that from another side of the transparent electrode and the data line in a display region, but the total parasitic capacitance between the transparent electrode and the data line on one side and the total parasitic capacitance between the transparent electrode and the data line on the other side are equal, which is able to counterbalance crosstalk and improve aperture ratio.

2. Description of Prior Art

Figure 1:
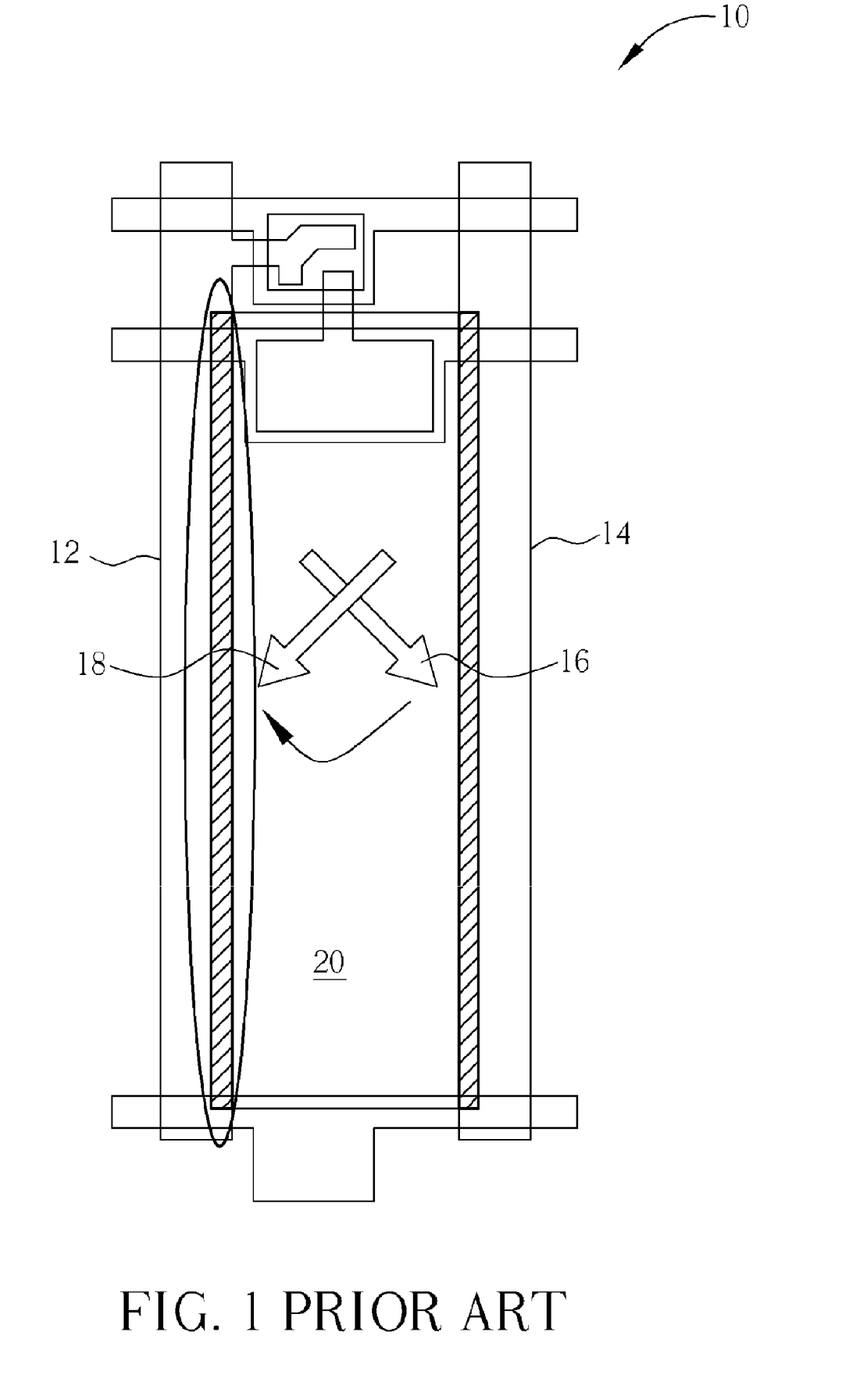
FIG. 1 is a schematic diagram showing a pixel structure of a conventional normally white twisted nematic liquid crystal display panel.

FIG. 1 is a schematic diagram of a pixel structure of a normally white twisted nematic liquid crystal display. As illustrated in FIG. 1, the pixel structure 10 of the twisted nematic LCD comprises two data lines 12, 14 with mutually parallel arrangement. The bottom substrate of the twisted nematic LCD includes an alignment layer having a first rubbing direction, which enables the liquid crystal molecules adjacent to the bottom substrate to align along a first direction 16, and the top substrate of the twisted nematic LCD includes an alignment layer having a second rubbing direction, which enables the liquid crystal molecules adjacent to the top substrate to align along a second direction 18. Thus, the liquid crystal molecules are aligned clockwise between the bottom substrate and the top substrate.

In each adjacent pixel structure 10, each pixel electrode 20 has a gap structurally disconnected to each other, which generates a fringe field between adjacent pixel structures 10. The fringe field influences the alignment of the liquid crystal molecules close to the data line and results in light leakage phenomenon in the display region (as shown in the enclosed region of FIG. 1). A conventional solution to light leakage is to enlarge the area of the data line 12 for shielding the light leakage. The enlarged data line 12, however, renders the parasitic capacitor generated on the side of the data line 12 larger than that on the side of another data line 14, and therefore results in the crosstalk effect and interfering displaying. Thus, to balance the parasitic capacitors on two sides of the pixel structure 10, the area of the data line 14 also has to increase accordingly to equalize the parasitic capacitance on the side of the data line 12 and the parasitic capacitance on the side of the data line 14. The enlargement of the data line 14, nevertheless, leads to a significant decrease of the aperture ratio.

SUMMARY OF THE INVENTION

One object of the present invention is to provide a pixel structure of a liquid crystal display panel to solve the crosstalk effect and promote the aperture ratio.

In order to achieve the above-mentioned object, the invention proposes a pixel structure of an LCD panel comprising a first transparent substrate, a first data line, a second data line, a transparent electrode, a compensating conducting pattern layer, a second transparent substrate and a liquid crystal layer. The first transparent substrate comprises a display region and a non-display region. The first data line and the second data line are disposed on the first transparent substrate and substantially arranged in parallel. The transparent electrode disposed on the first transparent substrate comprises a first side and a second side. In the display region, the first side of the transparent electrode and the first data line partially overlap and form a first parasitic capacitor, and the second side of the transparent electrode and the second data line partially overlap and form a second parasitic capacitor which is smaller than the first parasitic capacitor. In the non-display region, the first side of the transparent electrode and the first data line partially overlap and form a third parasitic capacitor, and the second side of the transparent electrode and a compensating conducing pattern layer partially overlap and form a fourth parasitic capacitor. The total parasitic capacitance of the first and the third parasitic capacitors and the total parasitic capacitance of the second and the fourth parasitic capacitors are substantially equal. The second transparent substrate disposed opposite to the first transparent substrate comprises a counter electrode. The liquid crystal layer, which includes a plurality of liquid crystal molecules, is interposed between the first and second transparent substrates. The liquid crystal molecules adjacent to a surface of the first transparent substrate facing the second transparent substrate are aligned along a first direction and the liquid crystal molecules adjacent to a surface of the second transparent substrate facing the first transparent substrate are aligned along a second direction, such that the liquid crystal molecules rotate from the first direction to the second direction, wherein the first direction points toward the second data line and the second direction points toward the first data line.

In order to achieve the above-mentioned object, the present invention further proposes an LCD comprising a first transparent substrate, a plurality of data lines, a plurality of transparent electrodes, a plurality of compensating conducting pattern layers, a second transparent substrate and a liquid crystal layer. The data lines disposed on the first transparent substrate are substantially mutually parallel, wherein a plurality of pixel regions are defined between any two adjacent data lines and each pixel region comprises a display region and a non-display region. The pixel region disposed on one side of any one data line has different driving polarity from that disposed on the other side of the data line. The transparent electrodes are disposed on the first transparent substrate, and each transparent electrode comprises a first side and a second side, wherein the first side of transparent electrode partially overlaps with the corresponding data line and form a first parasitic capacitor and the second side of the transparent electrode partially overlaps with the corresponding data line and form a second parasitic capacitor in the display region of each pixel region. Herein, the first parasitic capacitance is lager than the second parasitic capacitance. In the non-display region of each pixel region, the first side of the transparent electrode partially overlaps with the corresponding data line and form a third parasitic capacitor and the second side of the transparent electrode partially overlaps with the compensating conducting pattern layer and form a fourth parasitic capacitor, wherein the total parasitic capacitance of the first and the third parasitic capacitors and the total parasitic capacitance of the second and the fourth parasitic capacitors are substantially equal. The second transparent substrate disposed opposite to the first transparent substrate comprises a counter electrode. The liquid crystal layer, which comprises a plurality of liquid crystal molecules, is interposed between the first and second transparent substrates. The liquid crystal molecules adjacent to a surface of the first transparent substrate facing the second transparent substrate are aligned along a first direction and the liquid crystal molecules adjacent to a surface of the second transparent substrate facing the first transparent substrate are aligned along a second direction, such that the liquid crystal molecules rotate from the first direction to the second direction. The first direction points toward the second side of the transparent electrode and the second direction points toward the first side of the transparent electrode.

The compensating conducting pattern layer is disposed on the pixel structure of an LCD panel of the present invention in the non-display region, wherein the parasitic capacitor formed by the compensating conducting pattern layer and the transparent electrode compensates that between the side without light leakage of the transparent electrode and the data line in display region, such that the overlapping area of the side without light leakage of the transparent electrode and the data line decreases and the aperture ratio increases.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
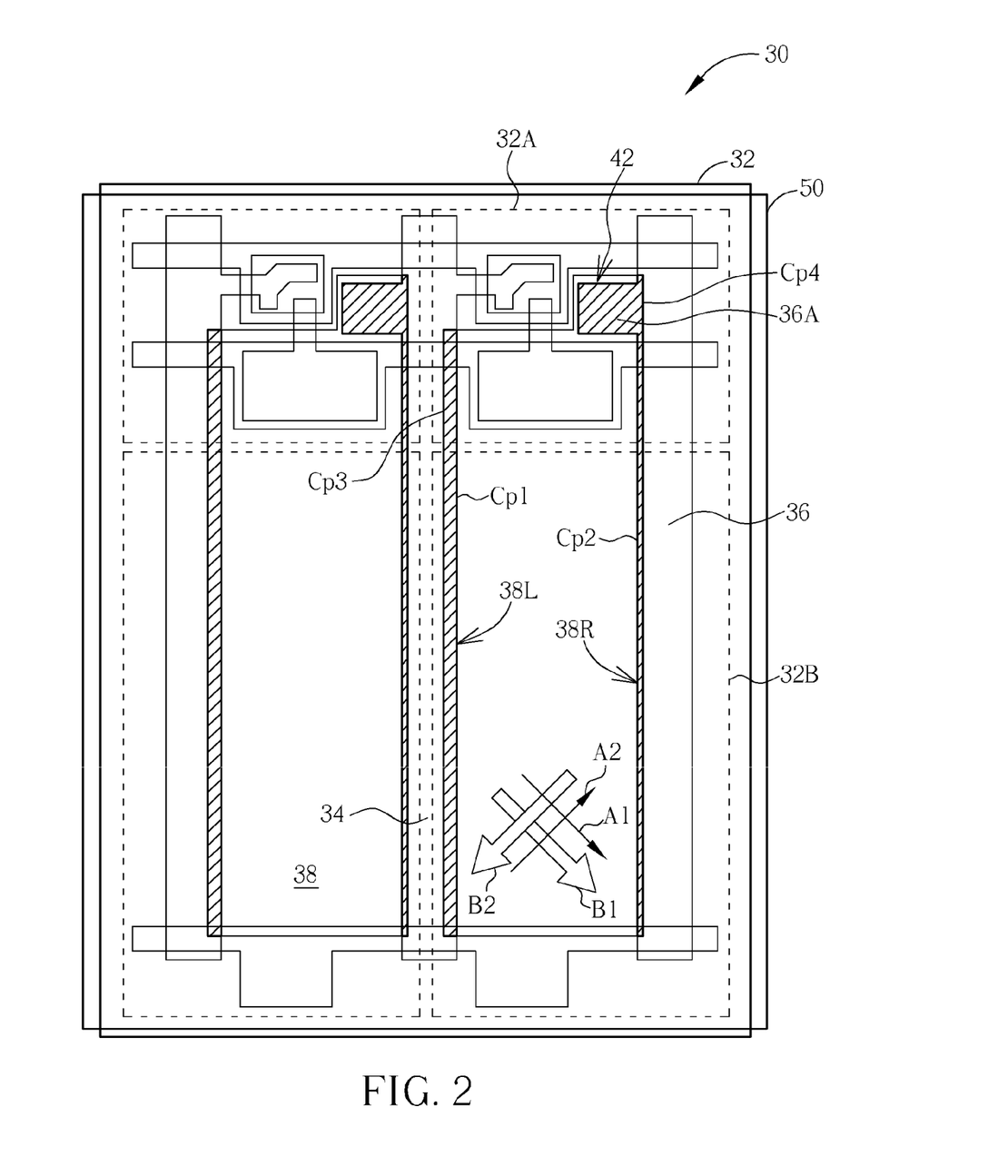
FIG. 2 and FIG. 3 are schematic diagrams showing a pixel structure of a liquid crystal display panel according to a preferred embodiment of the present invention.
Figure 3:
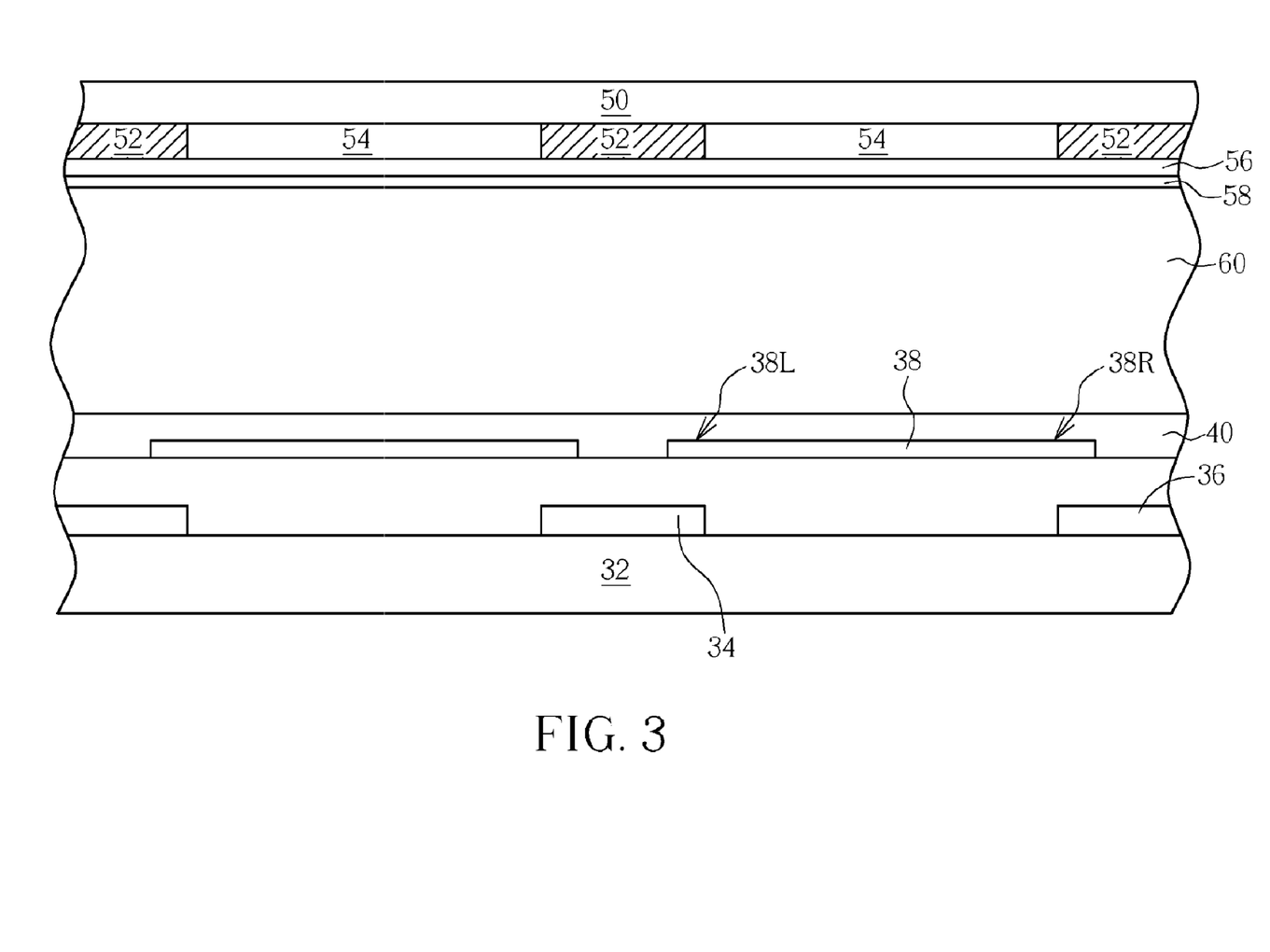

FIG. 2 and FIG. 3 are schematic diagrams of a preferred embodiment of a pixel structure of liquid crystal display panel, wherein the LCD panel of this embodiment is a normally white twisted nematic liquid crystal display and the driving mode comprises dot-inversion or column-inversion but not limited. Moreover, FIG. 2 is a top view of the pixel structure and FIG. 3 is a cross-sectional view of the pixel structure. In addition, some components of the pixel structure are not shown in FIG. 2 in order to highlight the feature of the present invention. As shown in FIG. 2 and FIG. 3, the pixel structure 30 of the LCD panel in this embodiment comprises a first transparent 32 (such as a thin film transistor substrate), a second transparent substrate 50 (such as a color filter substrate) and a liquid crystal layer 60, wherein the first transparent substrate 32 is disposed opposite to the second transparent substrate 50, and the liquid crystal layer 60 is disposed between the first transparent substrate 32 and the second transparent substrate 50. The first transparent substrate 32 comprises a plurality of pixel regions and each pixel region comprises a display region 32A and a non-display region 32B. Each pixel structure 30 comprises a first data line 34 and a second data line 36, wherein the first data line 34 and the second data line 36 disposed on the first transparent substrate 32 are substantially arranged in parallel. A transparent electrode 38 is disposed on the first transparent substrate 32, serving as the pixel electrode. The transparent electrode 38 comprises a first side 38L and a second side 38R, wherein the first side 38L of the transparent electrode 38 partially overlaps with the first data line 34 and the second side 38R of the transparent electrode 38 partially overlaps with the second data line 36. The first transparent substrate 32 further comprises a first alignment layer 40, wherein the first alignment layer 40 is disposed on the surface facing the second transparent substrate 50 and covers the transparent electrodes 38, and the first alignment layer 40 has a first rubbing direction A1.

The second transparent substrate 50 comprises a black matrix pattern 52, a color filter 54, a counter electrode 56 and a second alignment layer 58. The black matrix pattern 52 is approximately corresponding to the data lines (such as the first data line 34 and the second data line 36) of the first transparent substrate 32. The color filter 54 is approximately corresponding to the transparent electrode 38. The counter electrode 56 serves as a common electrode, which covers the surface of the black matrix pattern 52 and color filter 54. The second alignment layer 58 is disposed on the surface of the counter electrode 56 facing the first transparent substrate 32, wherein the second alignment layer 58 has a second rubbing direction A2 substantially perpendicular to the first rubbing direction A1.

The liquid crystal layer 60 comprises a plurality of liquid crystal molecules, where the liquid crystal molecules adjacent to the surface of the first transparent substrate 32 facing the second transparent substrate 50 are aligned along a first direction B1 and the liquid crystal molecules adjacent to the surface of the second transparent substrate 50 facing the first transparent substrate 32 are aligned along a second direction B2 by the design of the first rubbing direction A1 of the first alignment layer 40 and the second rubbing direction A2 of the second alignment layer 50. Accordingly, when viewed from the bottom layer of the liquid crystal layer 60 (adjacent to the first transparent substrate 32) to the top layer (adjacent to the second transparent substrate 50), the arrangement of the liquid crystal molecules rotate from the first direction B1 to the second direction B2. In addition, the first direction B1 and the second direction B2 are substantially mutually perpendicular. The first direction B1 points toward the second data line 36 and the second direction B2 points toward the first data line 34. The first rubbing direction A1 is identical to the first direction B1 and the second rubbing direction A2 is opposite to the second direction B2.

In the condition that the liquid crystal molecules rotate from the first direction B1 to the second direction B2, light leakage inevitably generates on the edge of the first data line 34 in the pixel structure 30 of the normally white twisted nematic liquid crystal display panel and the area of the first data line 34 must be enlarged for shielding the light leakage. Since the enlarged area of the first data line 34 renders the parasitic capacitance between the transparent electrode 38 and the first data line 34 larger than the parasitic capacitance between the transparent electrode 38 and the second data line 36, displaying quality will be affected. Thus, the present invention adopts the following design for concurrently overcoming the light leakage of the first data line 34, and balancing the parasitic capacitor between the transparent electrode 38 and the first data line 34 and the parasitic capacitor between the transparent electrode 38 and the second data line 36.

In the display region 32A of the pixel structure 30, the first side 38L of the transparent electrode 38 partially overlaps with the first data line 34, which forms the first parasitic capacitor $C_{p1}$, and the second side 38R of the transparent electrode 38 partially overlaps with the second data line 36, which forms the second parasitic capacitor $C_{p2}$, wherein the overlapping area between the first side 38L of the transparent electrode 38 and the first data line 34 is larger than that between the second side 38R of the transparent electrode 38 and the second data line 36. Consequently, the capacitance of the first parasitic capacitor $C_{P1}$ is larger than that of the second parasitic capacitor $C_{P2}$ in the display region 32A. In addition, in the non-display region 32B, the first side 38L of the transparent electrode 38 partially overlaps with the first data line 34, which forms the third parasitic capacitor $C_{P3}$, and the second side 38R of the transparent electrode 38 overlaps with the compensating conducting pattern layer 42, which forms the fourth parasitic capacitor $C_{P4}$. Because the overlapping area between the first side 38L of the transparent electrode 38 and the first data line 34 is smaller than that between the second side 38R of the transparent electrode 38 and the compensating conducting pattern layer 42, the capacitance of the third parasitic capacitor $C_{P3}$ is smaller than that of the fourth parasitic capacitor $C_{P4}$. By adjusting the overlapping area between the transparent electrode 38 and the first data line 34, and that between the second data line 36 and the compensating conducting pattern layer 42, the total parasitic capacitance of the first parasitic capacitor $C_{P1}$ and the third parasitic capacitor $C_{P3}$ is substantially equal to the total parasitic capacitance of the second parasitic capacitor $C_{P2}$ and the fourth parasitic capacitor $C_{P4}$.

By the above-mentioned design of the pixel structure 30, the light leakage on the edge of the first data line 34 can be shielded and the overlapping area of the second data line 36 and the transparent electrode 38 can be maintained in its normal size, and this makes the aperture ratio unaffected. The capacitance of the parasitic capacitor $C_{P1}$ generated between the transparent electrode 38 and the first data line 34 is larger than the capacitance of the parasitic capacitor $C_{P2}$ generated between the transparent electrode 38 and the second data line 36 in the display region 32A, though, the fourth parasitic capacitor $C_{P4}$ generated between the compensating conducting pattern layer 42 and the transparent electrodes 38 is larger than the third parasitic capacitor $C_{P3}$ generated between the transparent electrodes 38 and the second data line 36 in the non-display region 32B. As a result, the total parasitic capacitance of the first parasitic capacitor $C_{P1}$ and the third parasitic capacitor $C_{P3}$ is substantially equal to the total parasitic capacitance of the second parasitic capacitor $C_{P2}$ and the fourth parasitic capacitor $C_{P4}$.

Figure 4:
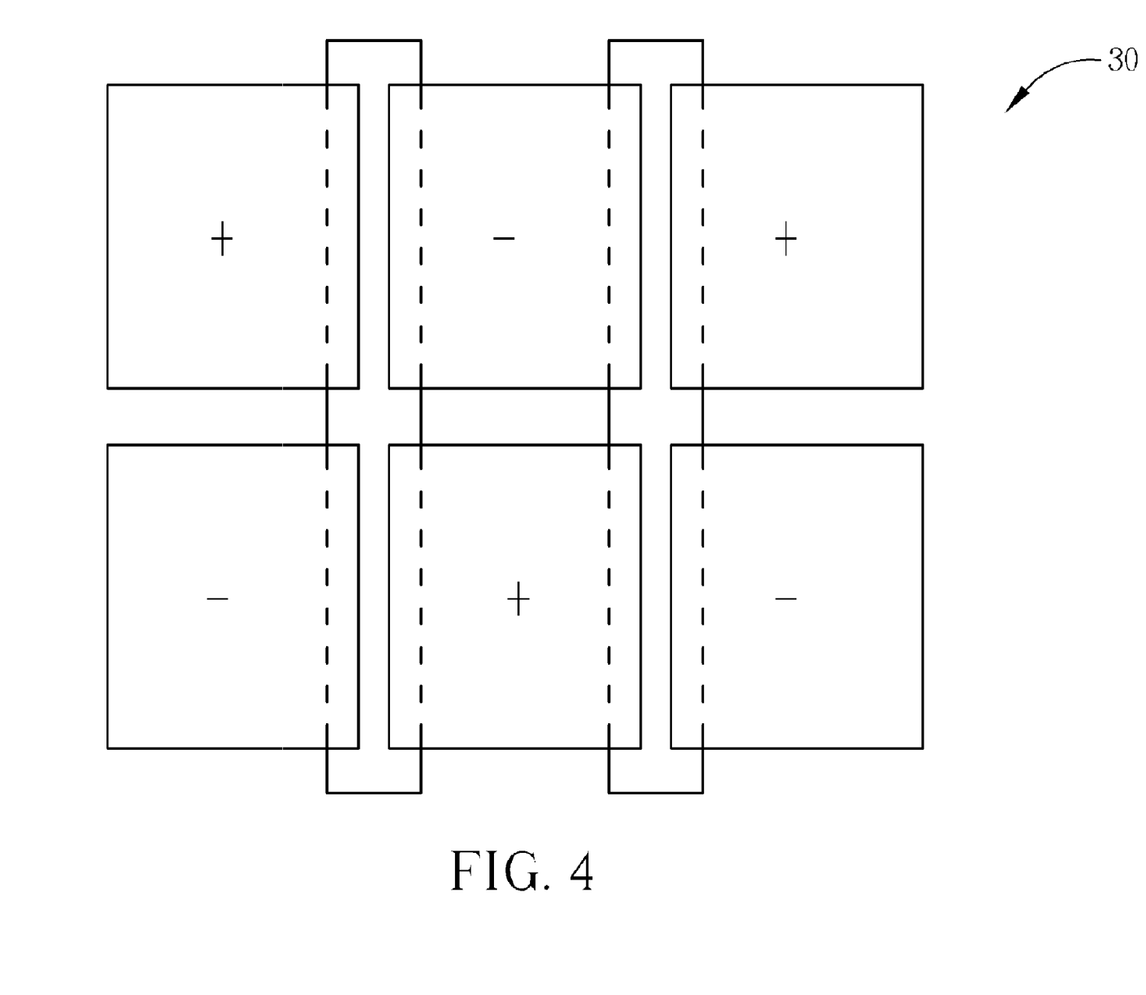
FIG. 4 is a diagram illustrating a dot-inversion driving liquid crystal display panel.
Figure 5:
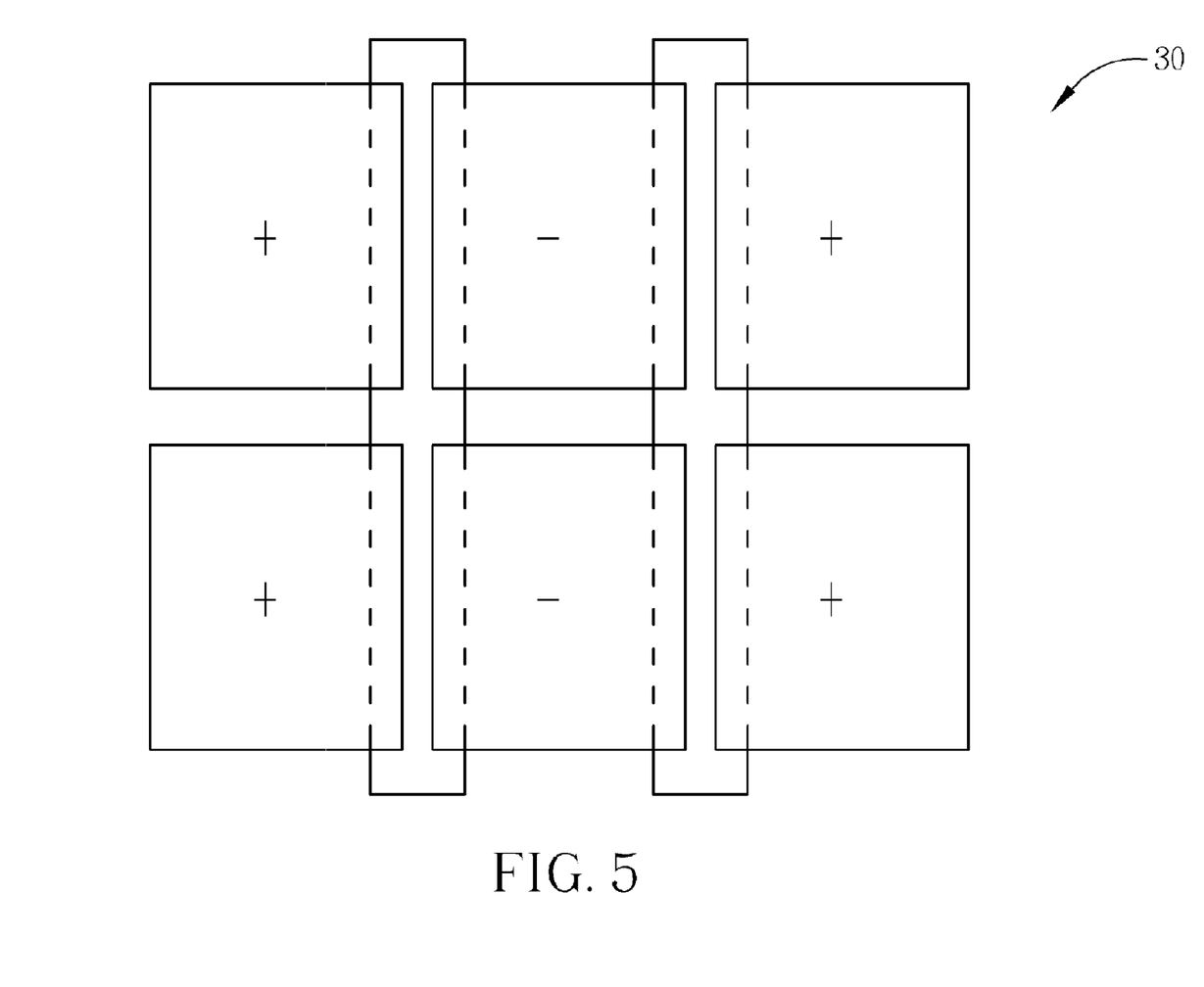
FIG. 5 is a diagram illustrating a column-inversion driving liquid crystal display panel.

The pixel structure 30 of this embodiment is applied on the LCD panel with different driving polarities with respect to the two adjacent pixels divided by the same data line. In this type of LCD panel, the equal parasitic capacitors on both sides of the transparent electrode 38 of the pixel structure 30 can eliminate the crosstalk effect, and the design of the compensating conducting pattern layer 42 has the advantage of promoting the aperture ratio. FIG. 4 illustrates a dot-inversion driving LCD panel, and FIG. 5 illustrates a column-inversion driving LCD panel.

In the present embodiment, the compensating conducting pattern layer 42 includes a salient part 36A of the second data line 36, which can be disposed in the position of the non-display region 32B without influence on displaying, according to different designs of the pixel structure 30 but not limited in FIG. 2.

Figure 6:
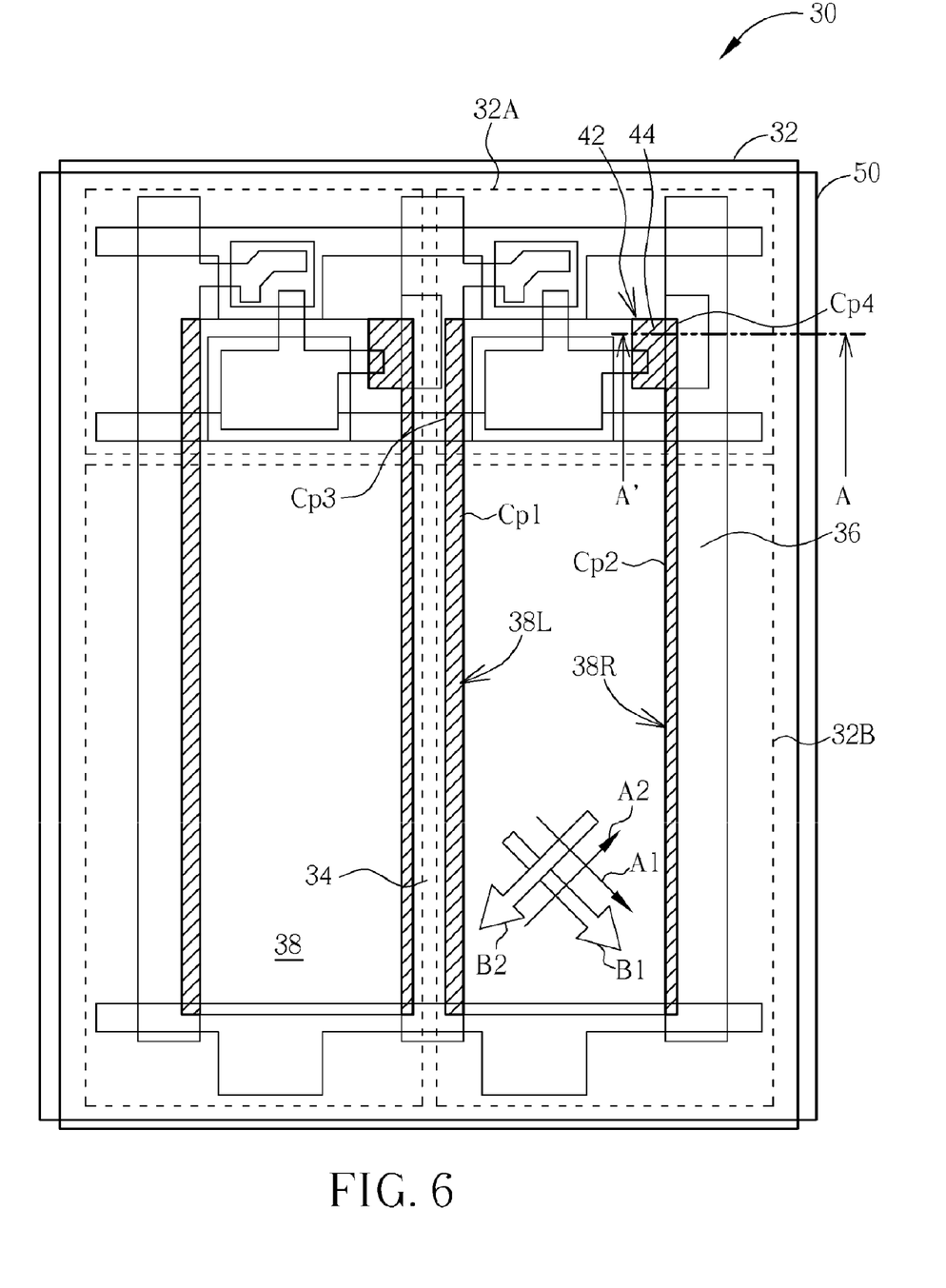
FIG. 6 and FIG. 7 are schematic diagrams showing a pixel structure of a liquid crystal display panel according to another preferred embodiment of the present invention.
Figure 7:
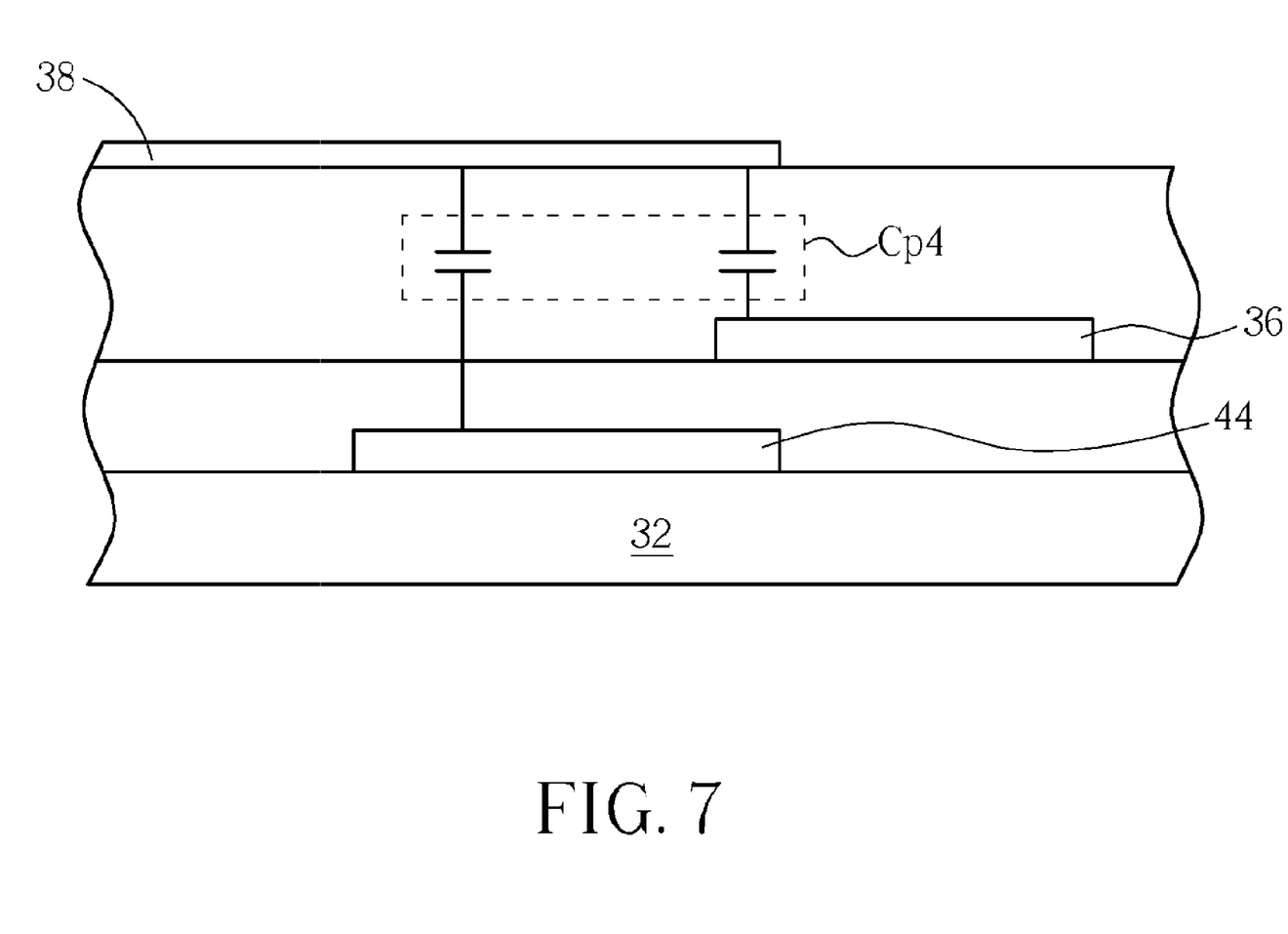

FIG. 6 and FIG. 7 are schematic diagrams of another preferred embodiment of the pixel structure of the LCD panel of the invention, wherein FIG. 6 is a top view and FIG. 7 is a cross-sectional view along a tangent line AA'. In order to compare the difference between the two embodiments, the present embodiment and the aforementioned embodiment use the same numerals to denote the same components which will not be described in detail. In the above-mentioned embodiment, the compensating conducting pattern layer 42 is a salient part 36A of the second data line 36; in the present embodiment, however, in an alternative embodiment, the compensating conducting pattern layer 42 is a floating conducting pattern layer 44 such as a floating metal pattern layer. As shown in FIG. 6 and FIG. 7, in the non-display region 32B, the floating conducting pattern layer 44 is preferably a metal pattern layer, which is made of the same metal layer as the gate electrode, but not limited. The floating conducting pattern layer 44 and the second side 38R of the transparent electrode 38 partially overlap and form the fourth parasitic capacitor $C_{P4}$. Moreover, the second side 38R of the transparent electrode 38 also can selectively overlaps partially with the second data line 36 in the non-display region 32B. Under such condition, the fourth parasitic capacitor $C_{P4}$ is conjointly formed by the overlapping part of the second side 38R of the transparent electrode 38 and the floating conducting pattern layer 44, and the overlapping part of the second side 38R of the transparent electrode 38 and the second data line 36. Besides, the first side 38L of the transparent electrode 38 partially overlaps with the first data line 34 to form the third parasitic capacitor $C_{P3}$, wherein the overlapping area of the first side 38L between the transparent electrode 38 and the first data line 34 is smaller than the overlapping area between the second side 38R of the transparent electrode 38 and the floating conducting pattern layer 44. Thus, the capacitance of the third parasitic capacitor $C_{P3}$ is smaller than the capacitance of the fourth parasitic capacitor $C_{P4}$. On the other hand, in the display region 32A of the pixel structure 30, the first side 38L of the transparent electrode 38 partially overlaps with the first data line 34 to form the first parasitic capacitor $C_{P1}$, and the second side 38R of the transparent electrode 38 partially overlaps with the second data line 36 to form the second parasitic capacitor $C_{P2}$, wherein the overlapping area between the first side 38L of the transparent electrode 38 and the first data line 34 is larger than the overlapping area of the second side 38R of the transparent electrode 38 and the second data line 36. Thus, the capacitance of the first parasitic capacitor $C_{P1}$ is larger than the capacitance of the second parasitic capacitor $C_{P2}$. By adjusting the overlapping area between the transparent electrode 38 and the first data line 34 and the overlapping area between the second data line 36 and the floating conducting pattern layer 44, the total parasitic capacitance of the first parasitic capacitor $C_{P1}$ and the third parasitic capacitor $C_{P3}$ is substantially equal to the total parasitic capacitance of the second parasitic capacitor $C_{P2}$ and the fourth parasitic capacitor $C_{P4}$.

From above-mentioned description we know, the compensating conducting pattern layer is disposed in the non-display region of the pixel structure of the LCD panel of the present invention, and the parasitic capacitor conjointly formed by the compensating conducting pattern layer and the transparent electrode is used to compensate for the parasitic capacitor between the opposite side without light leakage of the transparent electrode and the data line in the display region. Consequently, the overlapping area between the side without light leakage of the transparent electrode and the data line is reduced, and therefore the aperture ratio is improved.

Those skilled in the art will readily observe that numerous modifications and alterations of the device and method may be made while retaining the teachings of the invention.

What is claimed is:

1. A pixel structure of a liquid crystal display (LCD) panel comprising:
   a first transparent substrate comprising a display region and a non-display region;
   a first data line disposed on the first transparent substrate;
   a second data line disposed on the first transparent substrate substantially parallel to the first data line;

a transparent electrode disposed on the first transparent substrate, the transparent electrode having a first side and a second side, wherein the first side of the transparent electrode and the first data line partially overlap and form a first parasitic capacitor, the second side of the transparent electrode and the second data line partially overlap and form a second parasitic capacitor smaller than the first parasitic capacitor in the display region, wherein the first side of the transparent electrode and the first data line partially overlap and form a third parasitic capacitor, the second side of the transparent electrode and a compensating conducing pattern partially overlap and form a fourth parasitic capacitor in the non-display region, wherein a total parasitic capacitance of the first and the third parasitic capacitors and a total parasitic capacitance of the second and the fourth parasitic capacitors are substantially equal;

a second transparent substrate positioned opposite to the first transparent substrate, the second transparent substrate comprising a counter electrode; and a liquid crystal layer interposed between the first and second transparent substrates, wherein the liquid crystal layer comprises a plurality of liquid crystal molecules, the liquid crystal molecules adjacent to a surface of the first transparent substrate facing the second transparent substrate are aligned along a first direction, and the liquid crystal molecules adjacent to a surface of the second transparent substrate facing the first transparent substrate are aligned along a second direction, such that the liquid crystal molecules rotate from the first direction to the second direction, wherein the first direction points toward the second data line, and the second direction points toward the first data line.

2. The pixel structure of an LCD panel of claim 1, wherein the compensating conducting pattern layer comprises a salient part of the second data line.

3. The pixel structure of an LCD panel of claim 1, wherein the compensating conducting pattern layer comprises a floating conducting pattern layer.

4. The pixel structure of an LCD panel of claim 1, wherein the floating conducting pattern layer comprises a floating metal pattern layer.

5. The pixel structure of an LCD panel of claim 1, further comprising:
a first alignment layer positioned on the surface of the first transparent substrate facing the second transparent substrate; and
a second alignment layer positioned on the surface of the second transparent substrate facing the first transparent substrate;
wherein the first alignment layer has a first rubbing direction identical to the first direction, and the second alignment layer has a second rubbing direction opposite to the second direction.

6. The pixel structure of an LCD panel of claim 1, wherein the liquid crystal molecules comprise twisted nematic liquid crystal molecules.

7. The pixel structure of an LCD panel of claim 1, wherein the LCD panel comprises a normally white LCD panel.

8. A liquid crystal display panel comprising:
a first transparent substrate;
a plurality of substantially parallel data lines disposed on the first transparent substrate, wherein a plurality of pixels are defined between any two adjacent data lines and each pixel comprises a display region and a non-display region, wherein a pixel region on one side of any one data line has different driving polarity with that on the other side of the data line;

a plurality of transparent electrodes disposed on the first transparent substrate, each transparent electrode comprising a first side and a second side, wherein the first side of the transparent electrode and the first data line partially overlap and form a first parasitic capacitor, the second side of the transparent electrode and a second data line partially overlap and form a second parasitic capacitor smaller than the first parasitic capacitor in the display region of each pixel, wherein the first side of the transparent electrode and a first data line partially overlap and form a third parasitic capacitor, the second side of the transparent electrode and a compensating conducting pattern layer partially overlap and form a fourth parasitic capacitor in the non-display region of each pixel, wherein a total parasitic capacitance of the first and the third parasitic capacitors and a total parasitic capacitance of the second and the fourth parasitic capacitors are substantially equal;

a second transparent substrate positioned opposite to the first transparent substrate comprising a counter electrode; and a liquid crystal layer interposed between the first and second transparent substrates, wherein the liquid crystal layer comprises a plurality of liquid crystal molecules, the liquid crystal molecules adjacent to a surface of the first transparent substrate facing the second transparent substrate are aligned along a first direction, and the liquid crystal molecules adjacent to a surface of the second transparent substrate facing the first transparent substrate are aligned along a second direction, such that the liquid crystal molecules rotate from the first direction to the second direction, wherein the first direction points toward the second data line, and the second direction points toward the first data line.

9. The LCD panel of claim 8, wherein the compensating conducting pattern layer comprises a salient part of the second data line.

10. The LCD panel of claim 8, wherein the compensating conducting pattern layer comprises a floating conducting pattern layer.

11. The LCD panel of claim 8, wherein the floating conducting pattern layer comprises a metal pattern layer.

12. The LCD panel of claim 8, further comprising:
a first alignment layer positioned on the surface of the first transparent substrate facing the second transparent substrate; and
a second alignment layer positioned on the surface of the second transparent substrate facing the first transparent substrate;
wherein the first alignment layer has a first rubbing direction identical to the first direction, and the second alignment layer has a second rubbing direction opposite to the second direction.

13. The LCD panel of claim 8, wherein the liquid crystal molecules comprise twisted nematic liquid crystal molecules.

14. The LCD panel of claim 8, wherein the LCD panel comprises a normally white LCD panel.

15. The LCD panel of claim 8, wherein the LCD panel comprises a dot-inversion driving LCD panel.

16. The LCD panel of claim 8, wherein the LCD panel comprises a column-inversion driving LCD panel.

* * * * *